B. R. WRIGHT.
PROCESS AND APPARATUS FOR STANDARDIZING MILK.
APPLICATION FILED JUNE 3, 1919.

1,327,004.

Patented Jan. 6, 1920.

WITNESS:
Rob't A. Kitchel.

INVENTOR
Bert R. Wright
BY Frank S. Busser
ATTORNEY

UNITED STATES PATENT OFFICE.

BERT R. WRIGHT, OF POUGHKEEPSIE, NEW YORK, ASSIGNOR TO THE DE LAVAL SEPARATOR COMPANY, OF NEW YORK, N. Y., A CORPORATION OF NEW JERSEY.

PROCESS AND APPARATUS FOR STANDARDIZING MILK.

1,327,004.     Specification of Letters Patent.     Patented Jan. 6, 1920.

Application filed June 3, 1919. Serial No. 301,489.

*To all whom it may concern:*

Be it known that I, BERT R. WRIGHT, a citizen of the United States, residing at Poughkeepsie, county of Dutchess, and State of New York, have invented a new and useful Improvement in Processes and Apparatus for Standardizing Milk, of which the following is a full, clear, and exact description, reference being had to the accompanying drawings, which form a part of this specification.

In preparing milk for condensing it is desirable that the butter fat content should be as nearly as possible uniform. A preferred percentage of butter fat is 3.5%. Milk as received at the condensery may contain from 3.5% to 5% butter fat.

The object of my invention is to take milk having a relatively high fat content and standardize it so that it will have the percentage of butter fat desired.

While the execution of the process is not limited to the employment of a particular machine, the one shown in the drawings possesses features of advantage and novelty.

Figure 1:
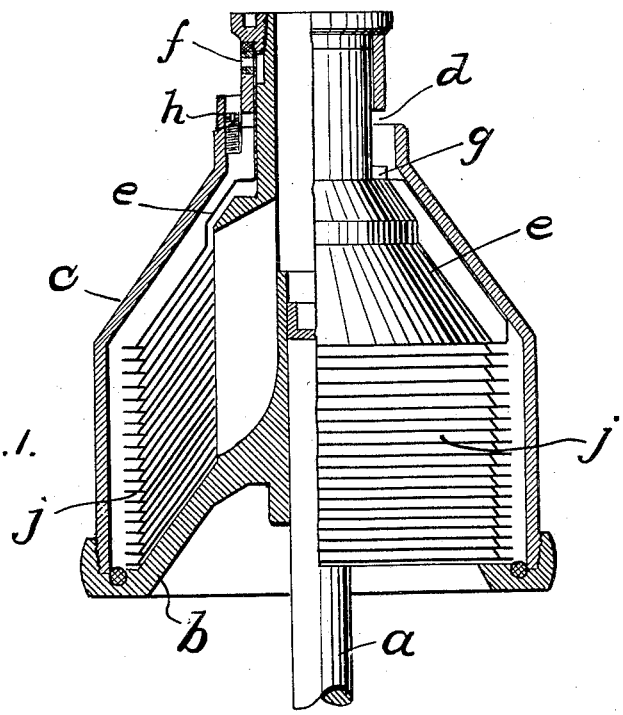
Figure 1 is a sectional view of a separator bowl embodying my invention.
Figure 2:
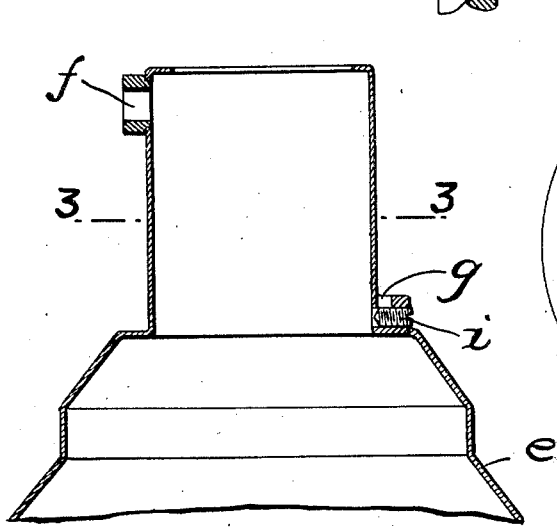
Fig. 2 is a partial view of the top disk of the bowl shown in section.
Figure 3:
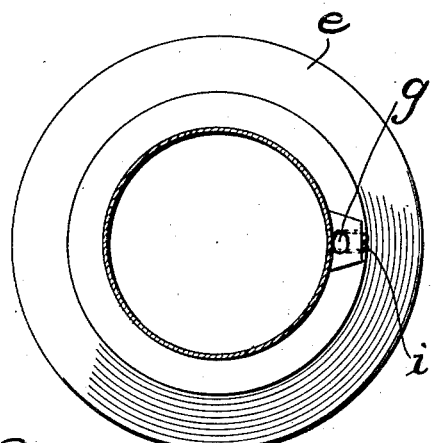
Fig. 3 is a cross-section on the line 3—3 of Fig. 2.

The bowl is mounted on and driven by the spindle *a*. *b* is the bowl bottom. *c* is the bowl shell and top in one piece and has a milk outlet *d*. *e* is the top or cream disk with a frusto-conical lower portion surmounted by a cylindrical neck portion in which there is the usual outlet *f* and also a special outlet *g*. *h* is the adjustable screw for regulating the density of cream produced. *i* is the adjustable screw for regulating the standardizing operation. *j* is the usual separating liner.

In operation, the milk is fed into the bowl in the usual method and separated. The skim milk passes outside and above the top disk *e* toward the outlet *d* and the cream passes inside of the top disk toward the outlet *f*. If the screw *i* is set to the extreme inward position, the bowl will operate as an ordinary separator. If the screw *i* is set part way out, part of the cream will escape through the outlet *g*, mix with the skim milk and be discharged from the outlet *d*, while the remainder will be discharged from the outlet *f*. It is practicable to feed to the bowl milk containing 4% fat and discharge from the outlet *d* milk containing, with very close uniformity, 3.5% fat, and from the outlet *f* a 40% cream.

Having now fully described my invention, what I claim and desire to protect by Letters Patent is:

1. The process of removing excess butter fat from milk which comprises separating the same, by centrifugal force, into skim milk and cream and while the separated cream is still under the influence of centrifugal force conveying such a proportion of the same into the outgoing current of separated skim milk as will enrich the latter to produce milk having a predetermined lower content of butter fat than the original milk.

2. In a separator bowl for reducing the butter fat content of milk, the combination with means dividing the milk that has been separated into separate outgoing currents of skim milk and cream, said bowl having milk and cream outlets, and regulatable means to divert a portion of the outgoing cream into the current of outgoing skim milk, thereby separately discharging from the bowl milk of the desired butter-fat content and a limited quantity of cream.

3. In a centrifugal bowl, in combination, a bottom, a top with a milk outlet, and a cream disk with a cream outlet and a supplementary outlet below the milk outlet from the bowl top.

4. In a centrifugal bowl, in combination, a bowl bottom, a bowl top, a top disk dividing the bowl into milk and cream passages, a milk outlet from the milk passage, a cream outlet from the cream passage, and an adjustable opening from the cream passage to the milk passage.

5. In a separator bowl, in combination, a bowl bottom, a bowl top with a milk outlet, a liner, a top disk, with a cream outlet, outside of which milk may flow toward the milk outlet and inside of which cream may flow toward the cream outlet, there being below the milk outlet a hole through the disk.

6. A separator bowl comprising a top disk having a frusto-conical lower portion and above that a neck portion provided with a cream outlet near its top and an adjustable secondary cream outlet near its bottom.

In testimony of which invention I have hereunto set my hand, at Poughkeepsie, on this 27 day of May, 1919.

BERT R. WRIGHT.